(12) United States Patent
Henke et al.

(10) Patent No.: US 8,744,683 B2
(45) Date of Patent: Jun. 3, 2014

(54) CONTROL DEVICE IN A STEERING SYSTEM OF A VEHICLE

(75) Inventors: Torsten Henke, Waiblingen (DE); Tobias Blesch, Asperg (DE); Pascal Hiry, Vaihingen/Enz (DE); Gerhard Walter, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 836 days.

(21) Appl. No.: 12/444,114

(22) PCT Filed: Oct. 2, 2007

(86) PCT No.: PCT/DE2007/001765
§ 371 (c)(1),
(2), (4) Date: Dec. 4, 2009

(87) PCT Pub. No.: WO2008/040330
PCT Pub. Date: Apr. 10, 2008

(65) Prior Publication Data
US 2010/0106371 A1 Apr. 29, 2010

(30) Foreign Application Priority Data
Oct. 2, 2006 (DE) .................. 10 2006 046 834

(51) Int. Cl.
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G05D 1/00* (2006.01)
*G06F 7/00* (2006.01)
*G06F 17/00* (2006.01)
*G06F 19/00* (2011.01)

(52) U.S. Cl.
USPC .............................................. 701/41; 701/42

(58) Field of Classification Search
USPC ........................................................ 701/41, 42
See application file for complete search history.

(56) References Cited

U.S. PATENT DOCUMENTS

| | | | | |
|---|---|---|---|---|
| 4,598,787 A * | 7/1986 | Drutchas | ..................... | 180/444 |
| 5,253,172 A * | 10/1993 | Ito et al. | ..................... | 701/41 |
| 5,276,624 A | 1/1994 | Ito et al. | | |
| 5,343,393 A * | 8/1994 | Hirano et al. | ..................... | 701/41 |
| 6,354,396 B1 * | 3/2002 | Horton et al. | ..................... | 180/446 |
| 2006/0000662 A1 * | 1/2006 | Heilig et al. | ..................... | 180/446 |
| 2006/0293818 A1 * | 12/2006 | Lu et al. | ..................... | 701/41 |
| 2007/0083308 A1 * | 4/2007 | Hara | ..................... | 701/41 |

FOREIGN PATENT DOCUMENTS

| | | |
|---|---|---|
| CN | 2471613 | 1/2002 |
| DE | 197 03 903 | 8/1998 |
| DE | 10 2005 053 902 | 5/2007 |
| EP | 0 460 582 | 12/1991 |

(Continued)

*Primary Examiner* — Imran Mustafa
(74) *Attorney, Agent, or Firm* — Michael Best & Friedrich LLP

(57) ABSTRACT

The invention relates to a control device for regulating or controlling a servo-drive unit in a steering system of a vehicle. In order to determine the initial zero position of the steering shaft the value of at least one vehicle state variable is taken into consideration as an input signal, said variable not being a steering angle variable. The steering shaft is in the initial zero position if said vehicle state variable within a defined range of values.

16 Claims, 5 Drawing Sheets

(56) References Cited

FOREIGN PATENT DOCUMENTS

| | | |
|---|---|---|
| EP | 0 732 252 | 9/1996 |
| EP | 0 856 720 | 8/1998 |
| JP | 1-191536 | 8/1989 |
| JP | 5-131947 | 5/1993 |
| JP | 2002-39877 | 2/2002 |
| JP | 2003276635 | 10/2003 |
| JP | 2004-329472 | 11/2004 |
| JP | 2005-205998 | 8/2005 |
| JP | 2006-248354 | 9/2006 |

* cited by examiner

CONTROL DEVICE IN A STEERING SYSTEM OF A VEHICLE

TECHNICAL FIELD

The invention relates to a control unit for regulating or controlling a servo-drive unit in a steering system of a vehicle according to the generic term of claim 1.

BACKGROUND

DE 197 03 903 A1 describes a steering system in a motor vehicle, at which a steering wheel angle is transferred on a steering linkage by a steering shaft and a transmission, which is coupled cinematically with the steered wheels of the vehicle and which adjusts the wheels with the desired steering angle. For a steering support an electric servo engine is provided, which initiates a supporting moment over the steering linkage. The height of the supporting moment depends on different factors, amongst other on the hand moment that is initiated by the driver, if necessary also on other vehicle parameters and state variables as for example the vehicle speed.

The information about the variable of the steering angle, which is preset by the driver over the steering wheel, is furthermore required for diverse electronic regulating and controlling systems in motor vehicles. For determining the actually adjusted steering angle a touch-less working rotation angle sensor is provided according to DE 197 03 903 A1, which is construed for detecting a magnetic field, which is created by a magnet that is connected torque-proof with the steering shaft. The magnet is arranged next to the steering pinion, which sits at the front side of the steering shaft and which transfers the steering movement over the transmission on to the steering linkage. The sensor is located on the other hand in the transmission housing. The size of the steering angle is calculated as a function of the circulating magnetic field that is created by the magnet. But hereby it has to be considered that the steering wheel can carry out multiple circulations, which makes the information over the average or initial zero position of the steering shaft necessary for the accurate determination of the actual steering angle variable.

SUMMARY

The invention is based on the task to determine the steering angle in a steering system of a vehicle with simple measures. According to an advantageous embodiment the information about the actual steering angle shall be determined also without using a steering angle sensor at the steering shaft.

This task is solved according to the invention with the characteristics of claim 1. The sub-claims provide useful improvements.

The control device according to the invention, which is used for regulating and/or controlling a servo-drive unit in a steering system of a vehicle, processes at least one vehicle state variable, which can be supplied to the control device and which is not a steering angle variable, whereby the initial zero position of the steering shaft has to be determined from the value of this vehicle state variable. The initial zero position of the steering shaft is present if the vehicle state variable in question lies in a defined range of values. As a vehicle state variable is in particular a variable that determines the cinematic and kinetic state of the vehicle or a thereof deducted variable, for example a cinematic degree of freedom of the vehicle.

The determination of the initial zero position of the steering shaft represents a significant information, which is necessary for the exact determination of the steering angle. Because the steering transmission is selected at automobiles and utility vehicles in such a way that several rotations of the steering wheel are possible for the entire adjustable steering angle range between the extreme deflections of the steerable wheels, the information about the initial zero position of the steering shaft is definitely necessary, because it could not be surely determined otherwise in which angle range the steering shaft is actually present. The information about the initial zero position is now determined according to the invention over at least one vehicle state variable, which is not a steering angle variable. The difference angular velocity between the steered wheels can be used for example as vehicle state variable, whereby the initial zero position is detected if the difference angular velocity lies below a threshold. But basically all vehicle state variables come into consideration, which can give information on the actual angle position in the steering system. Alternatively or cumulatively the difference angular velocity of the steered wheels this can for example also be the steering moment, the engine moment of an electric servo engine in the steering system, the lateral acceleration of the vehicle or the yaw rate or another state variable.

The information processing takes place in the control device, which is provided in the steering system for regulating or controlling the servo-drive unit. The determination of the initial zero position in the control device means the integration of an additional functionality in the control device without additional sensory means, but only on the basis of vehicle state variables, which are already present in the vehicle or in regulating or control devices in the vehicle and which are processed in the control device on a software level. The information about the vehicle state variables is for example transferred over a CAN-bus onto the control device in the steering system.

The determination of the initial zero position of the steering shaft can furthermore based on the determination of the actual value of the steering angle. In order to get the absolute value of the steering angle it is conveniently referred to a further steering angle information, whereby it is basically sufficient to determine a value, which correlates with the steering value. Thereby the placing position of the steering angle of the servo-drive unit is for example determined, which is mechanically firmly coupled with the steering shaft, so that from the actual placing position of the servo-drive unit the steering angle can be concluded. Thereby the exact determination of the absolute steering angle is possible in connection with the information about the initial zero position of the steering shaft.

Conveniently an electric servo engine is used as servo-drive unit, whose engine moment can also be used as vehicle state variable for determining the initial zero position of the steering shaft. But also the height of the steering angle can be determined with the aid of the electric servo engine, because the rotor shaft of the electric servo engine is cinematically coupled with the steering shaft and because the transmission relation between steering shaft rotation and rotor shaft rotation is known.

Alternatively to an electric servo engine a hydraulic servo engine can basically be also used. In that case the correcting displacement of the hydraulic cylinder, which is cinematically coupled over the steering drive with the steering shaft, is used for determining the steering angle.

According to an advantageous improvement it is provided that an index signal is processed in the control device, which is produced for improving the value and making it reasonable for the initial zero position. This index signal produced at each circulation of the steering shaft. The index signal is conveniently created by a sensor unit at the steering shaft. If for example the difference angular velocity between the steered wheels of the vehicle is used as vehicle state variable for determining the initial zero position, a reasonability process can takes place with the aid of the index signal in such a way that extraordinary vehicle states as for example a spinning of the vehicle can be excluded or identified. As a rule or normally a synchronization of the steered wheels will only take place in the initial zero position of the steering shaft. But during the spinning of the vehicle the case may occur that a reasonability process request is carried out over the additional index signal. By which it can be determined that the vehicle moves outside the normal case and therefore the steering shaft is outside its initial zero position despite synchronization of the steered wheels.

For determining the rotor placement signal a magnet is arranged conveniently at the rotor shaft, whose magnetic field is detected by an assigned housing-solid magnetic field sensor. Because this rotor position signal is security relevant the determination of the rotor position signal can be carried out in a redundant way, whereby two independently working magnetic field sensors come into consideration for detecting the magnetic field on the on the one hand, but on the other hand also two signal processing units, which are assigned to these magnetic field sensors. Alternatively to the two signal processing units also only one single signal processing unit can be provided, which is coupled with a switch, over which the single signal processing unit has to be selectively connected with one of the two magnetic field sensors.

For the index signal, which is used independently of the detection of the rotor position and for the reasonability process of the rotor position, a single magnetic field sensor is sufficient. From the rotor position the steering angle information is finally derived.

BRIEF DESCRIPTION OF THE DRAWINGS

Further advantages and convenient embodiments can be takes from the further claims, the description of the figures and the drawings.

It is shown in.

The same components are labeled with the same reference signs in the figures.

DETAILED DESCRIPTION

Figure 1:
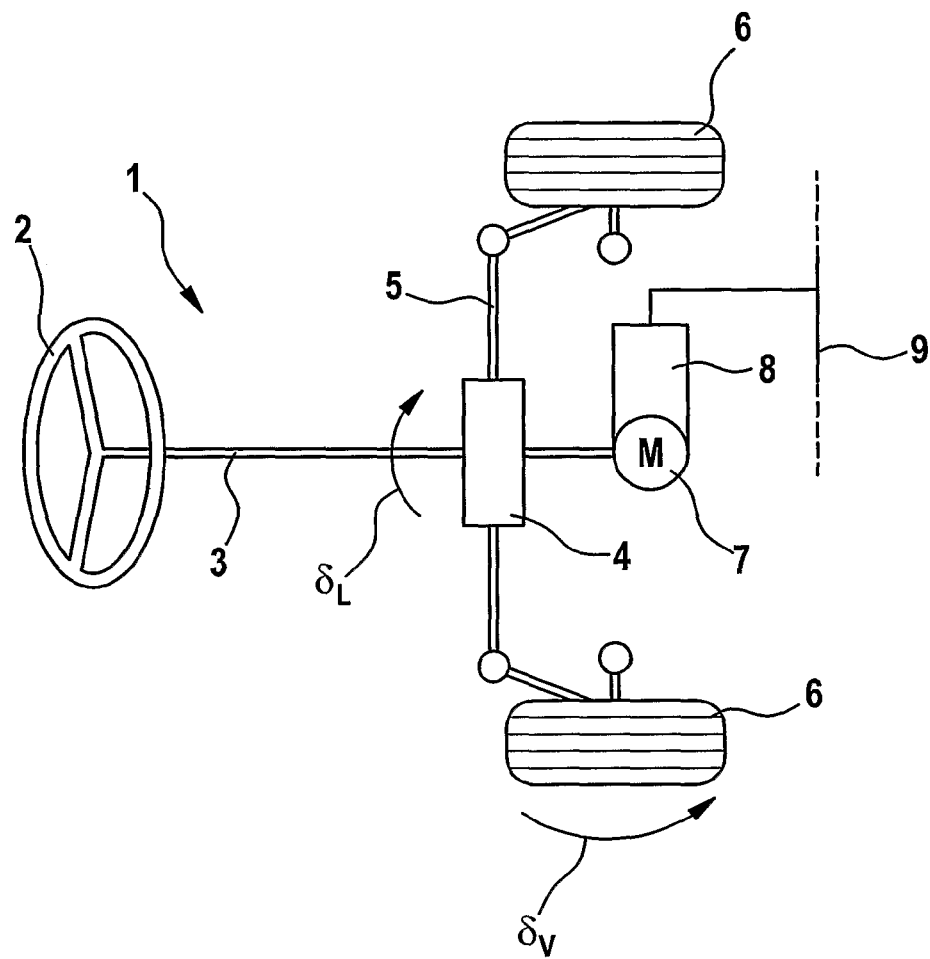
FIG. 1 shows schematically an illustration of a steering system in a vehicle, with an electric servo engine, by which a support moment can be created in the steering system, whereby the servo engine is assigned to a control device.

The steering system 1 that is shown in FIG. 1 comprises a steering wheel 2, which is connected in a torque-proof manner with a steering arbor or shaft 3, by which the steering angle $\delta L$ that has been preset by the driver can be transferred on to the steered front wheels 6, in which a wheel steering angle $\delta v$ is adjusted. The steering shaft 3 is coupled cinematically with a steering linkage 5 over a steering gear 4, which comprises a steering rack, which is adjusted during a steering movement, whereupon the wheel steering angle $\delta v$ is adjusted in the front wheels 6.

For supporting the hand moment that is brought up over the steering wheel 2 by the driver an electric servo engine 7 is provided, which computerizes an additional support moment over the steering gear 4 into the steering system 1. The servo engine 7 is construed as electromotor. The servo engine 7 is assigned to a control device 8, which communicates with a CAN-bus 9. Over the CAN-bus 9 the data and signals are exchanged with other regulation or control devices in the vehicle.

Figure 2:
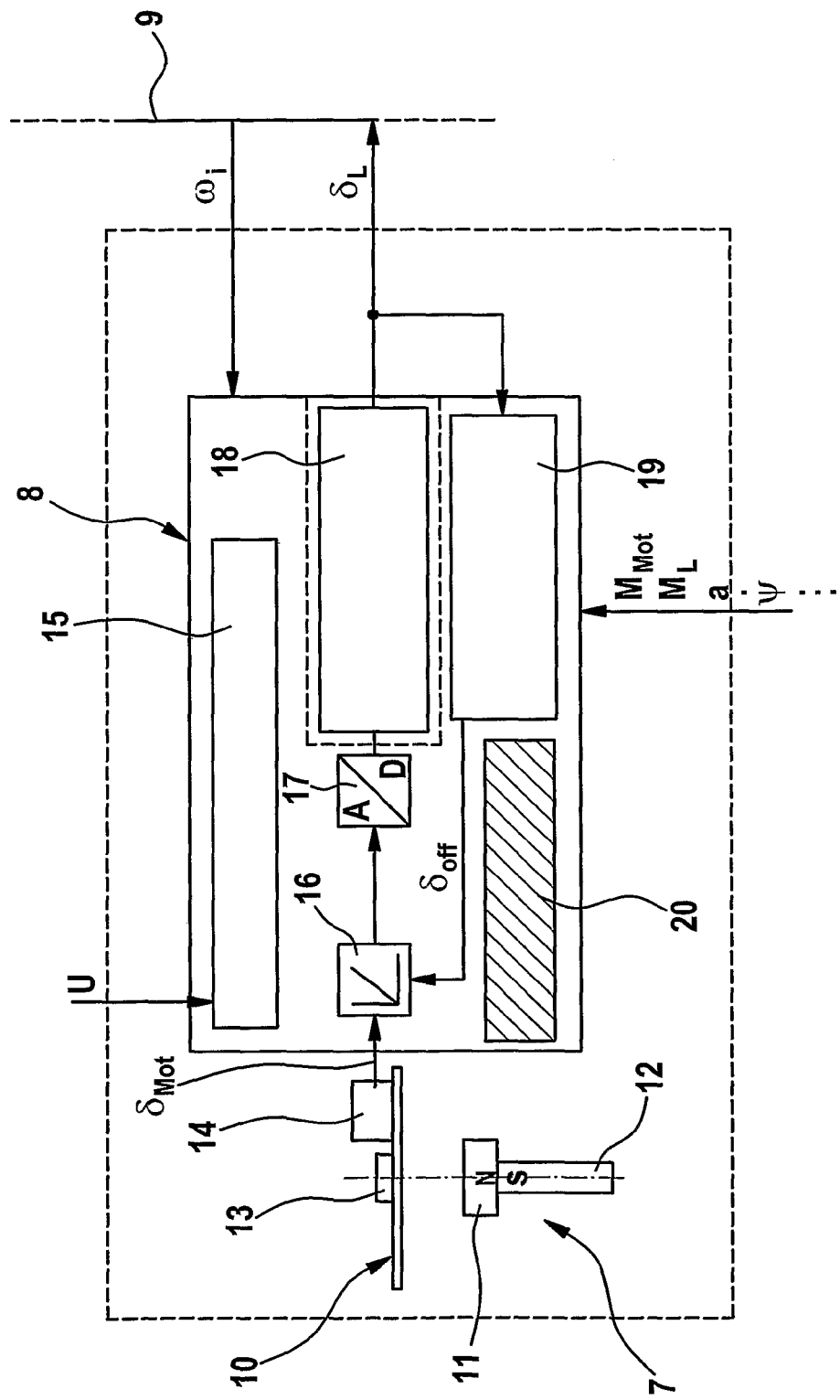
FIG. 2 shows schematically an illustration of the electric servo engine including the control device, with an illustration of the basic function course in the control device.

As it can be taken from FIG. 2 the electric servo engine 7 is assigned to a sensor technology 10, over which the rotation angle $\delta_{Mot}$ of the rotor shaft 12 of the servo engine 7 is determined. The sensor technology 10 comprises a torque-proof magnet 11, which is connected with the rotor shaft 12 and which sits on the front side of the rotor shaft and whose magnetic field is detected by a magnetic field sensor 13—for example a reverberation sensor that is arranged housing-firmly. Furthermore the sensor technology 10 comprises a sensor evaluation unit 14, in which the value about the rotor rotation angle Mot is determined from the sensor signals and forwarded to the control device 8.

The control device 8 is equipped with a current drain control 15, which controls the consumption of current in the control device 8 and which is supplied externally with a supply voltage U.

Furthermore the control device 8 comprises diverse components, in which the incoming signals are processed and the actually adjusted steering angle $\delta L$ is calculated as output signal. As input signal, as it is exemplary registered, the angular velocity $\Omega_1$ of each wheel, but in particular the angular velocity of the steered wheels flows in, whereby this information is supplied over the CAN-bus 9. The engine moment $M_{Mot}$, which is created by the electric servo engine 7, the steering moment $M_L$, the vehicle lateral acceleration a and/or the yaw rate $\psi$ and if necessary further vehicle state variables can be computerized into the control device 9 as further vehicle state variables, whereby these state variables are also conveniently supplied over the CAN-bus 9. The determined steering angle $\delta_L$ is distributed as output signal over the CAN-bus.

The control device 8 comprises a first calculating unit 16 as electronic components, which comprises an amplification link and an offset-correcting unit, an A/D-converter 17, a general calculation unit 18, an offset-correcting unit 19 as well as a monitoring unit 20. The rotor rotation angle $\delta_{Mot}$, which is determined by the sensor technology 10, is initially supplied to the first calculation unit 16, in which an amplification and an offset-correction is carried out. Subsequently the determined value is delivered to the A/D-converter 17, in which the analog signal is converted into a digital signal. This digital signal is then forwarded into the calculation unit 18, where a reasonability process of the determined value is carried out on software level, which takes in particular place by a comparison with reference signals. The previously mentioned vehicle sate variables are considered for the determination of the steering angle $\delta_L$ in the calculation unit 18.

For improving the quality of the calculated values the steering angle $\alpha_L$ is supplied to the offset-correcting unit 19, in which an offset-angle $\delta_{off}$ is determined and supplied in a reverse loop of the calculation unit 16.

The monitoring unit 20 contains a security logic, in order to check and ensure the functionality of the modules of the control device 8. Therefore test structures are realized in the monitoring unit 20, over which the test signals are created, which are supplied to the single modules of the control device 8 as digital signals, in order to check their functionality. Furthermore the monitoring unit 20 can also gather signals from the modules and submit them to a reasonability process.

The offset-correcting unit 19 is built according to the type of a regulator, in which the calculated value of the steering angle $\delta_L$ is led back over the offset-correcting unit 19 and a correcting value $\delta_{off}$ is supplied to the integrator 16 as offset-angle correction value. Over the offset-correcting unit 19 the steering angle signal is purified from interfering variables.

Figure 3:
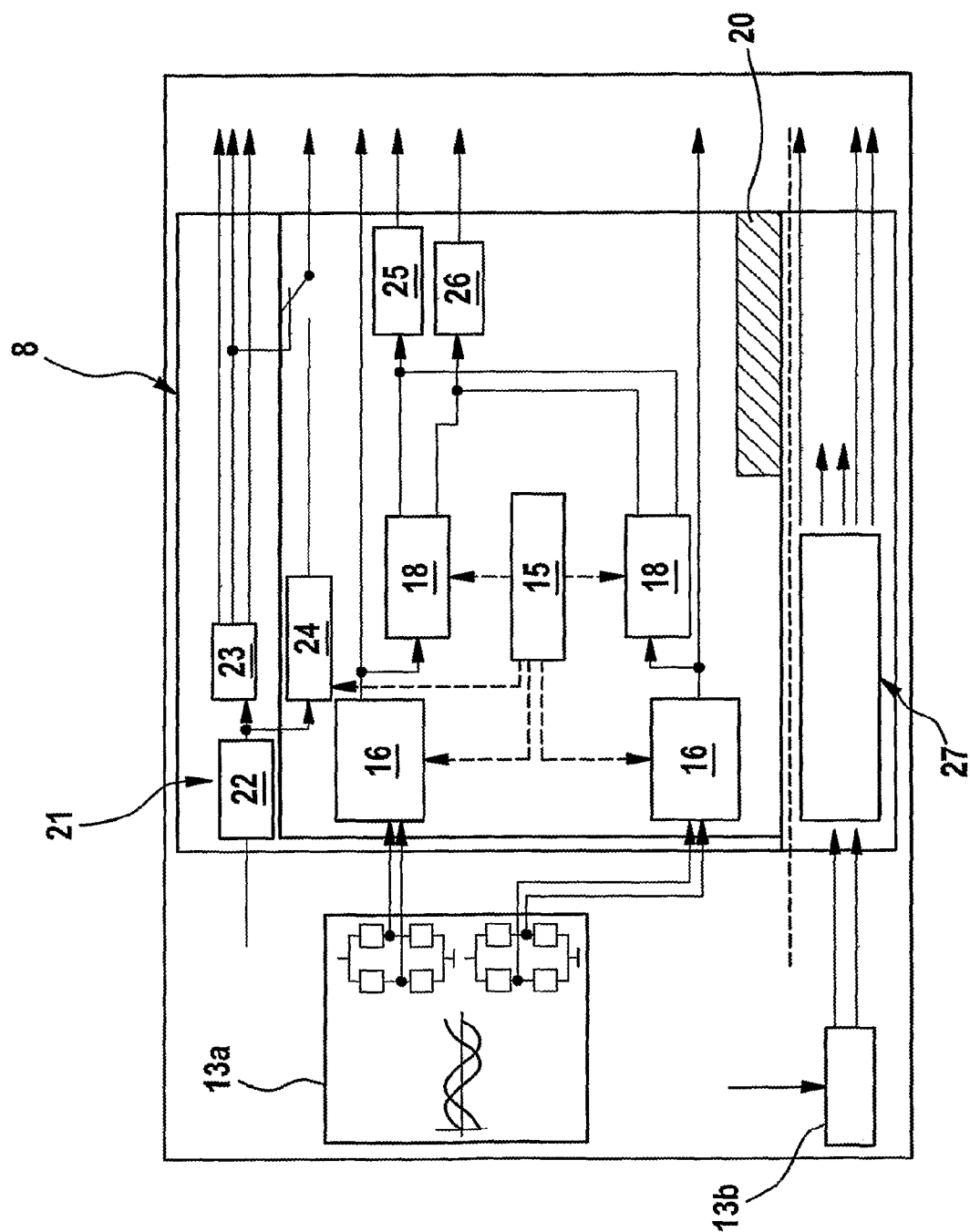
FIG. 3 is a detailed illustration of the function course in the control device.

FIG. 3 shows a detailed illustration of the ASIC that is realized in the control device 8. In a first sensor 13a, which is a component of the sensor technology 10, sine and cosine signals are generated from the detected sensor signals over evaluation set-ups, which are each supplied to the first calculation units 16 in the control device 8. The first calculation units 16 are also available in pairs like the second subsequent calculating units 18 and are each assigned to one of the sensor signals from the first sensor 13a. in the first calculation units 16 a first signal processing takes place, subsequently the pre-processed signals are supplied to the subsequent second calculation units 18. The processing of the sensor signals takes place parallel in the sine and cosine course.

After a further signal processing in the second calculating units 18 the output signals are provided to further processing modules in the vehicle over interfaces 25 and 26, whereby the interface 25 is a SPI-interface (serial peripheral interface) and the second interface ^26 is an UART-interface (universal asynchronous receiver/transmitter).

The monitoring unit 20 takes over monitoring and test functions for the individual modules of the control device 8 as it is described in FIG. 2.

Furthermore a current drain system 21 is provided in the control unit 8, which comprises a current monitoring unit 22, a current drain unit 23 and a sensor current drain unit 24.

As it is shown in the lower half of the drawing of FIG. 3 the signals of a second sensor 13b are processed by a calculation block 27, which provides a calculation unit like the first calculation unit 16, which is integrated in the calculation block that is assigned to the first sensor 13a. the signal processing of the unit that is assigned to the second sensor 13b has no steering angle evaluation, only the detection of the rotor position in on-state takes place. In off-state this unit is completely deactivated.

The current drain control 15 provides an energy efficiency thereby that the control device 8 is switched into a sleep-mode, if the vehicle is standing and the engine is turned off.

Figure 4:
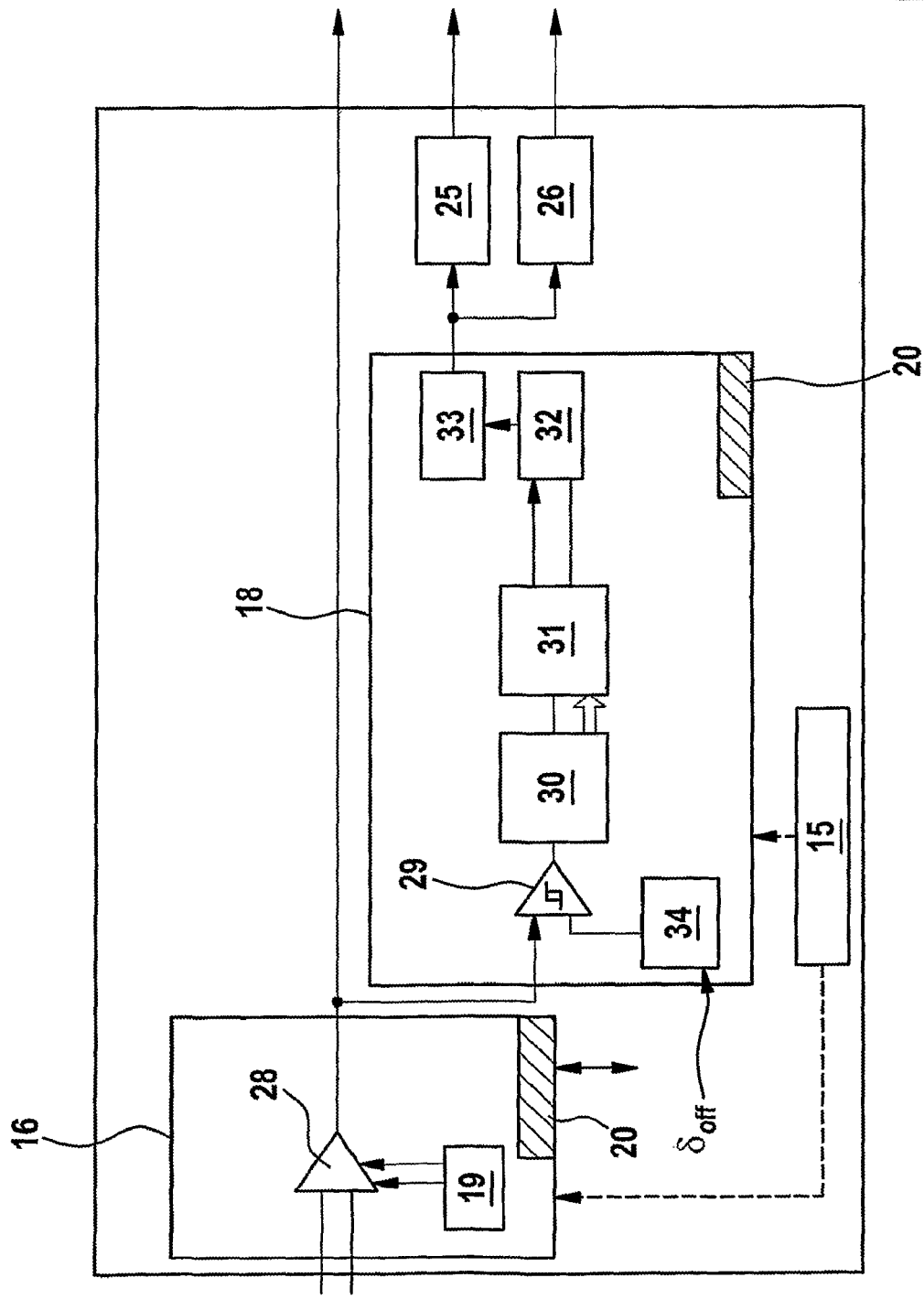
FIG. 4 shows in detail a structure picture of a digital analyzing unit from FIG. 3.

FIG. 4 shows the calculation units 16 and 18 in detail one more time. The first calculation unit 16, which is supplied with the sensor signals, comprises an amplification link 28, in which the difference of the two signals that come form the sensor is amplified and furthermore purified by an offset-value doff, which is determined by the offset-correction unit 19. This offset $\delta_{off}$ is also supplied to the second calculation unit 18 over a module 34.

The amplified signal of the difference of the two sensor signals is subsequently supplied in the second calculation unit 18 to a comparing link 29, in which a comparison between the supplied value and the already previously mentioned offset is carried out. The thereof crated signal is supplied to a signal storage 30, in which the a signal storage takes place over at least two consecutive time bins, as well as a rotation direction detection unit 31, in which the rotation direction of the rotor of the electric servo engine is determined from the at least two consecutive signals. In a subsequent integrator 32 an on-integration of the signals takes place, which can be stored in a further storage 33. Over the interfaces 25 and 26 the won output signals can be picked off from the control device 8.

Figure 5:
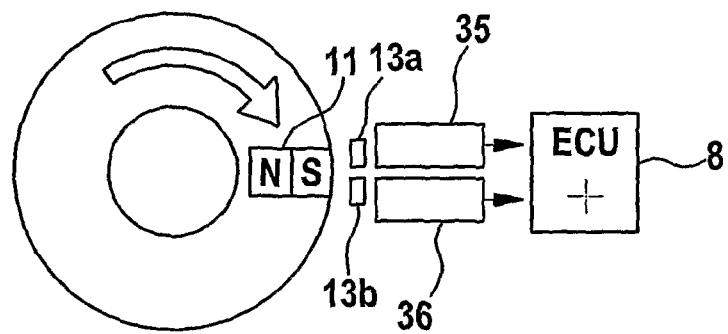
FIG. 5 shows schematically an illustration of the electric servo engine with a sensor technology for creating an index signal at each circulation of the rotor shaft, whereby the sensor technology comprises two magnetic field sensors and two signal processing units.
Figure 6:
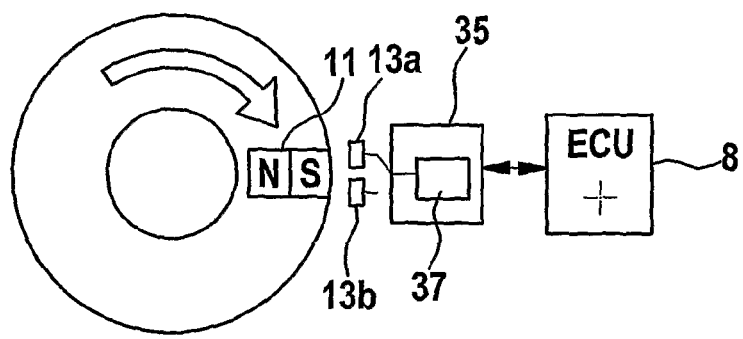
FIG. 6 shows a corresponding illustration to FIG. 5, at which the sensor technology also comprises two magnetic field sensors, but only one signal processing unit and additionally one switch.

FIGS. 5 and 6 show the embodiments for a redundant sensor detection as well as signal processing. In order to sense the circulation of the shaft—either of the steering shaft of the steering system or the rotor shaft of the electric drive engine—a magnet 11 is connect in a torque-proof manner with the shaft, whose magnetic field is detected by two magnetic field sensors 13a and 13b. According to FIG. 5 each of the two magnetic field sensors 13 and 13b is assigned to a signal processing unit 35 or 36, so that on the level of the signal processing units redundancy is present. The processed signals are subsequently supplied to the further processing modules. Even the signal transfer from the signal processing units 35 and 36 to the control device 8 takes place separately and independently from each other, so that redundancy is also present in so far.

According to FIG. 6 the same sensor technology is provided with torque-proof arranged magnets 11 and two magnet field sensors 13a and 13b as in FIG. 5. But the difference to FIG. 5 is that the two magnetic field sensors 13a and 13b are only assigned to one signal processing unit 35, which is equipped with a switch 37, over which the signal processing unit 35 has to be connected selectively with one of the two sensors 13a or 13b. in this simplified embodiment an additional signal processing unit can be waived, but the signals of the two sensors 13a and 13b cannot be processed simultaneously. The data transfer between the signals processing unit 35 and the modules of the control device 8 takes place bi-directional.

In the signal processing units according to FIGS. 5 and 6 a data conversion from analog to digital takes place, furthermore also test functions can be realized in the signal processing units.

The magnetic field sensors 13a and 13b are conveniently a component of the control device 8 in the embodiments according to FIGS. 5 and 6.

The invention claimed is:

1. A control device for regulating or controlling a servo-drive unit in a steering system of a vehicle, the servo-drive unit being an electro servo unit, and wherein a steering angle preset by a driver is transferred from a steering shaft to a steering linkage to adjust a wheel steering angle at the steered wheels of the vehicle, and wherein a support moment is produced by the servo-drive unit that effects the steering linkage;

wherein the control device is configured to determine an initial zero position of the steering shaft by evaluating a value of at least one vehicle state variable that is supplied to the control device, wherein an initial zero position is present if the at least one vehicle state variable lies within a defined range of values, wherein the at least one vehicle state variable is not a steering angle variable, and wherein the initial zero position is determined without using a steering angle sensor at the steering shaft, wherein the at least one vehicle state variable is at least one of: a steering moment, an engine moment of the servo-drive unit in the steering system, a lateral acceleration of the vehicle, and a yaw rate, and wherein an index signal is used for improving and checking plausibility of the value of the at least one vehicle state variable.

2. The control device of claim 1, wherein a difference of angle velocities between the steered wheels is used in addition to the at least one vehicle state variable to determine the initial zero position, wherein the initial zero position is present if the difference angle velocity lies below a threshold.

3. The control device of claim 1, wherein the steering moment is determined and used as the at least one vehicle state variable for determining the initial zero position.

4. The control device of claim 1, wherein the engine moment is determined in the servo engine and used as the at least one vehicle state variable for determining zero position.

5. The control device of claim 1, wherein the lateral acceleration is determined and used as the at least one vehicle state variable for determining the initial zero position.

6. The control device of claim 1, wherein the yaw rate is determined and used as the at least one vehicle state variable for determining the initial zero position.

7. The control device of claim 1, wherein an index signal is used for improving and checking plausibility of the value of the at least one vehicle state variable, wherein the index signal is produced at each circulation of at least one of the steering shaft and any other shaft coupled with the steering shaft and circulating it.

8. The control device of claim 7, wherein the index signal is produced at each circulation of a rotor shaft of the electric servo engine.

9. The control device of claim 7, wherein a magnet is arranged at the steering shaft for determining the index signal, wherein a magnetic field of the magnet is detected by a magnetic field sensor.

10. The control device of claim 1, wherein a plurality of independently working magnetic field sensors for detecting a steering shaft circulation are provided, wherein signals of the sensors are processed in the control device.

11. The control device of claim 10, wherein a signal processing unit is arranged and assigned to each one of the plurality of sensors.

12. The control device of claim 10, wherein only a signal processing unit and one reversing switch are provided, wherein the signal processing unit is connected optionally to one of the plurality of sensors.

13. The control device of claim 1, wherein the control device is connected to a housing of the servo-drive unit.

14. The control device of claim 1, wherein the servo-drive unit is a hydraulic servo engine.

15. A method of regulating or controlling an electro servo-drive unit with a control device in a steering system of a vehicle, the method comprising:
transferring a steering angle preset by a driver from a steering shaft to a steering linkage to adjust a wheel steering angle at the steered wheels of the vehicle, and wherein a support moment is produced by the servo-drive unit that affects the steering linkage; and
determining, using the control device, an initial zero position of the steering shaft by evaluating a value of at least one vehicle state variable that is supplied to the control device, wherein an initial zero position is present if the at least one vehicle state variable lies within a defined range of values, wherein the at least one vehicle state variable is not a steering angle variable, and wherein the initial zero position is determined without using a steering angle sensor at the steering shaft, wherein the at least one vehicle state variable is at least one of: a steering moment, an engine moment of the electro servo-drive unit in the steering system, a lateral acceleration of the vehicle, and a yaw rate, and wherein an index signal is used for improving and checking plausibility of the value of the at least one vehicle state variable.

16. A control device for regulating or controlling a servo-drive unit in a steering system of a vehicle, wherein a steering angle preset by a driver is transferred from a steering shaft to a steering linkage to adjust a wheel steering angle at the steered wheels of the vehicle, and wherein a support moment is produced by the servo-drive unit that effects the steering linkage, wherein the servo-drive unit is an electric servo engine;
wherein the control device is configured to determine an initial zero position of the steering shaft by evaluating a value of at least one vehicle state variable that is supplied to the control device, wherein an initial zero position is present if the at least one vehicle state variable lies within a defined range of values,
and wherein the initial zero position is determined without using a steering angle sensor at the steering shaft,
and wherein the at least one vehicle state variable is not a steering angle variable, and wherein the value of the at least one vehicle state variable is a difference of angle velocities between the steered wheels,
and wherein the initial zero position is present if the difference angle velocity lies below a threshold, and wherein a steering moment is determined and used as the at least one vehicle state variable for determining the initial zero position,
and wherein an engine moment is determined in the servo engine and used as the at least one vehicle state variable for determining the initial zero position,
and wherein a lateral acceleration is determined and used as the at least one vehicle state variable for determining the initial zero position,
and wherein a yaw rate is determined and used as the at least one vehicle state variable for determining the initial zero position,
and wherein an index signal is used for improving and checking plausibility of the value of the at least one vehicle state variable, wherein the index signal is produced at each circulation of at least one of the steering shaft and any other shaft coupled with the steering shaft and circulating it.

* * * * *